(No Model.) 2 Sheets—Sheet 1.

C. H. SAWYER.
PLOW.

No. 342,390. Patented May 25, 1886.

Witnesses.
Geo. McNeil
Richard Paul

Inventor.
Charles H. Sawyer,
By R. C. Pyrul.

(No Model.) 2 Sheets—Sheet 2.

C. H. SAWYER.
PLOW.

No. 342,390. Patented May 25, 1886.

Witnesses.
Geo. M. Neii
Richard Paul

Inventor.
Charles H. Sawyer,
By A. P. Paul
Atty.

UNITED STATES PATENT OFFICE.

CHARLES H. SAWYER, OF MAPLETON, DAKOTA TERRITORY.

PLOW.

SPECIFICATION forming part of Letters Patent No. 342,390, dated May 25, 1886.

Application filed September 21, 1885. Serial No. 177,671. (No model.)

*To all whom it may concern:*

Be it known that I, CHARLES H. SAWYER, a citizen of the United States, and a resident of Mapleton, in the county of Cass and Territory of Dakota, have invented certain Improvements in Plows, of which the following is a specification.

My invention relates, particularly, to improvements in gang-plows for use in steam-plowing or for plowing with horses, but the invention is applicable also to single plows to a certain extent; and my invention consists, generally, in the construction and combination of devices hereinafter described, and particularly pointed out in the claims.

Figure 1:
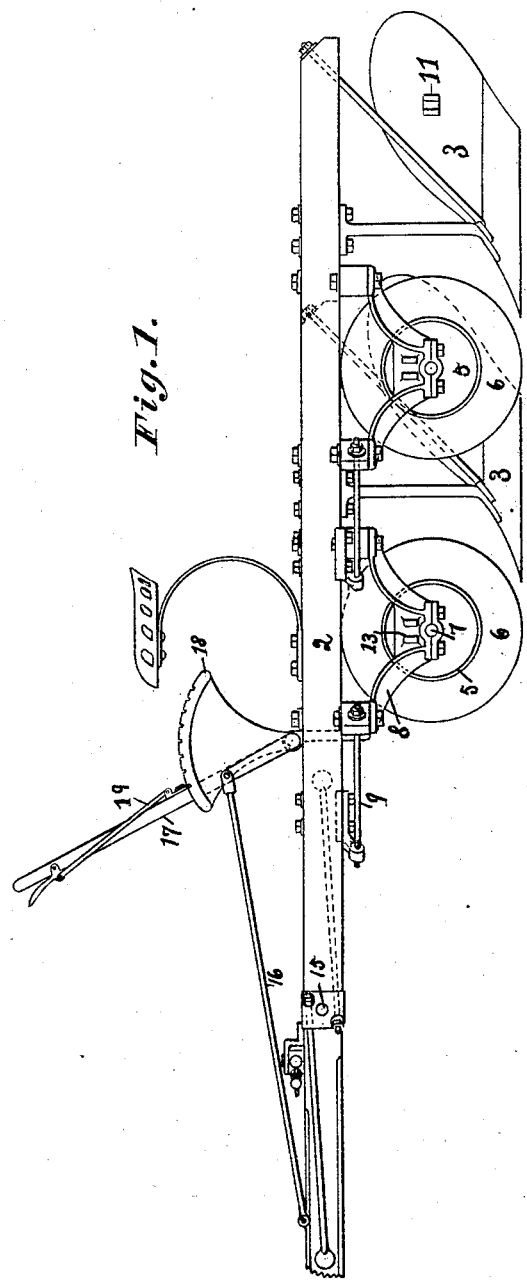
Figure 2:
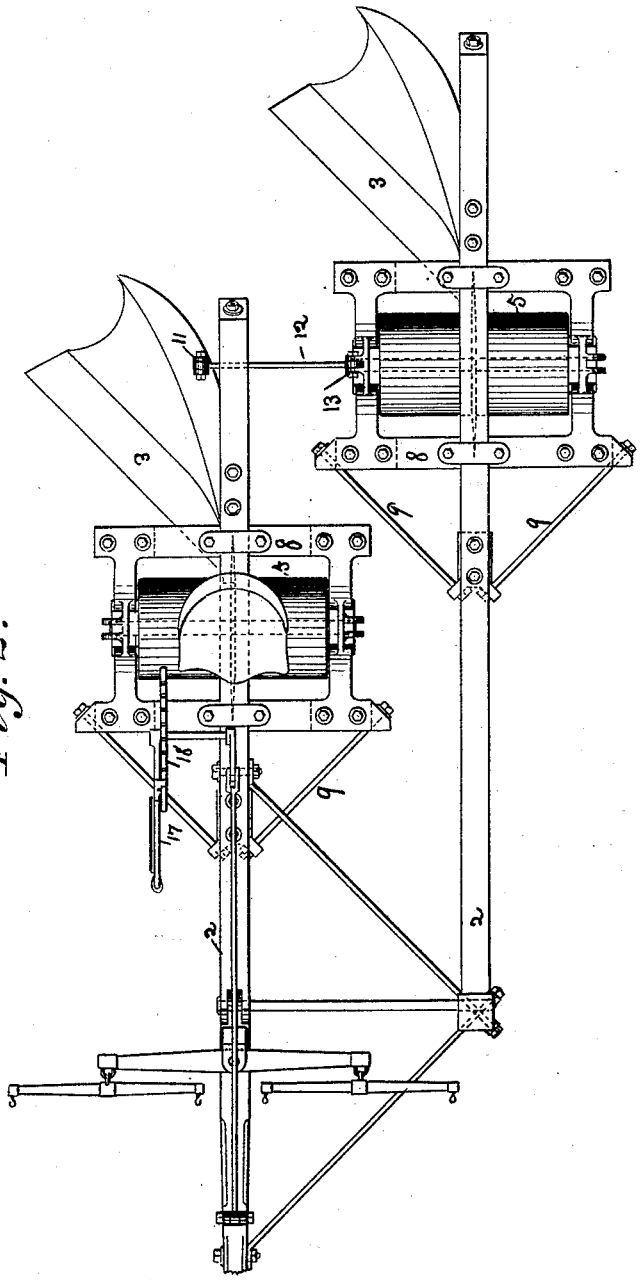

In the accompanying drawings, forming part of this specification, Figure 1 is a side elevation, and Fig. 2 is a plan, of two plows embodying my invention.

Any number of the plows may be used together, and means may be employed for attaching horses to the plows or for attaching the plows to a traction-engine.

2 represents the plow-beam, and 3 the mold-board, which is secured to the beam by any suitable means, as the bolts and nuts 4, or a clevis may be used, so that the plow may be vertically adjusted.

The colter consists of a roll, 5, which is adapted to bear and roll on the ground, and the cutter 6, which projects from substantially the center of the roll for a distance equal to about the depth that the colter is desired to cut. This roll is journaled in bearings 7 in a frame, 8, which is secured by suitable means to the plow-beam.

The frame is preferably provided with the diagonal rods or braces 9 9, that extend from the sides of the frame in front to the beam. These rods are provided with threads and nuts, as shown. By loosening the nuts on one rod and tightening those on the other the frame may be turned slightly, so as to set the colter so that it will work onto or off the land. With this construction of rolling colter I am able to dispense with a landside to the plow and use the mold-board alone, as shown in the drawings.

In using the plow without a landside the draft on the curved mold-board has a tendency to turn the plow to one side. To overcome this, I use the colter having the roll 5 and cutter 6, and locate it near the point of the mold-board. The thrust of the mold-board is thereby taken upon the side of the colter, which acts as a landside to keep the plow straight.

In using horses for drawing the plow, I have the plow-beam, or the beam of the first plow, when more than one is used, jointed to the pole by a joint that permits the pole to move vertically, but does not permit a lateral movement. The only side draft that there is is thus directly upon the neck-yoke. When several plows are used together, it is desirable to provide means for causing the side draft of each mold-board to be borne upon the colter of the next plow. For this purpose I provide a connecting-bar extending from the mold-board of one plow to the colter-frame of the next plow. The mold-board 3 is preferably provided with lugs 11, to which the bar 12 is jointed. This bar is connected at its opposite end to the frame carrying the colter of the next plow. This frame is preferably provided with the lugs 13 over the box in which the colter is journaled, and to these lugs the end of the bar 12 is pivoted. The mold-board of one plow and the colter of the next are thereby connected, and the side thrust of the mold-board is taken by the side of the colter that bears against the land. The colter is kept in an upright position by the roll from which the cutter projects. This combined cutter and roller may be constructed in any suitable manner. It will, however, preferably consist of an ordinary form of rolling colter arranged between two rolls on a suitable journal or axle.

The beam 2 and the pole are connected, as described, by a joint that permits movement of either relative to the other in a vertical direction. A rod, 16, is preferably jointed to the pole, and its opposite end is jointed to a lever, 17, that is pivoted to the plow-beam or to the frame that supports the colter. A ratchet, 18, and a pawl, 19, are provided for holding this lever in any position. By drawing back the lever 17 the forward end of the plow-beam will be thrown down and the rear end lifted, thus carrying the mold-board out of the ground. The plow may then be moved around supported on the rolling colter.

I claim as my invention—

1. The combination, in a plow without a landside, with the mold-board 3 and beam 2, and means for securing said mold-board to said beam, of the roll 5 and colter 6, projecting therefrom, and means for journaling said roll and colter beneath said beam in front of said mold-board, whereby said roll and colter serve also as a landside, all substantially as described.

2. The combination, in a gang-plow without landsides, of the mold-board 3, means for securing said mold-board to the plow-beam, a rod, 12, means for attaching said rod to said mold-board, and means for attaching said rod to the next plow of the gang, all substantially as described, and for the purpose set forth.

3. The combination, with the beam 2 and adjustable frame 8, of the roll and colter 5 6, journaled in said adjustable frame, the diagonal braces 9, provided with adjusting-nuts, as and for the purpose set forth.

4. The combination, with the plow having the frame 8, of the roll and colter 5 6, the mold-board 3, and the rod 12, jointed to said mold-board and to the frame 8 of the next plow of the gang, all substantially as described.

In testimony whereof I have hereunto set my hand this 12th day of September, 1885.

CHARLES H. SAWYER.

In presence of—
A. C. PAUL,
H. N. PECK.